No. 812,814. PATENTED FEB. 20, 1906.
G. BROWN & G. TAYLOR.
SHAFT GATE.
APPLICATION FILED MAR. 6, 1905.

Witnesses
O. E. Murray.
M. A. Schmidt

Inventors
George Brown and George Taylor
by
Milo B. Stevens and Co. Attorneys

UNITED STATES PATENT OFFICE.

GEORGE BROWN AND GEORGE TAYLOR, OF LADD, ILLINOIS.

SHAFT-GATE.

No. 812,814.

Specification of Letters Patent.

Patented Feb. 20, 1906.

Application filed March 6, 1905. Serial No. 248,462.

*To all whom it may concern:*

Be it known that we, GEORGE BROWN and GEORGE TAYLOR, citizens of the United States, residing at Ladd, in the county of Bureau and State of Illinois, have invented new and useful Improvements in Shaft-Gates, of which the following is a specification.

Our invention relates to a gate for elevator-shafts, and more particularly one which is operated by the elevator-cage.

Figures 1, 3:
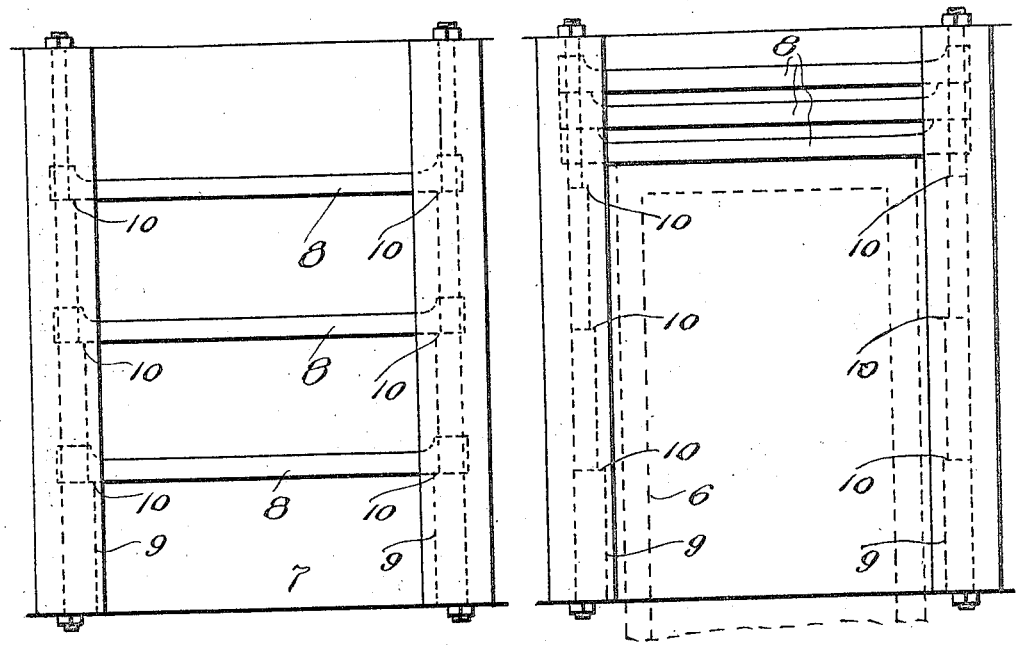
Figure 2:
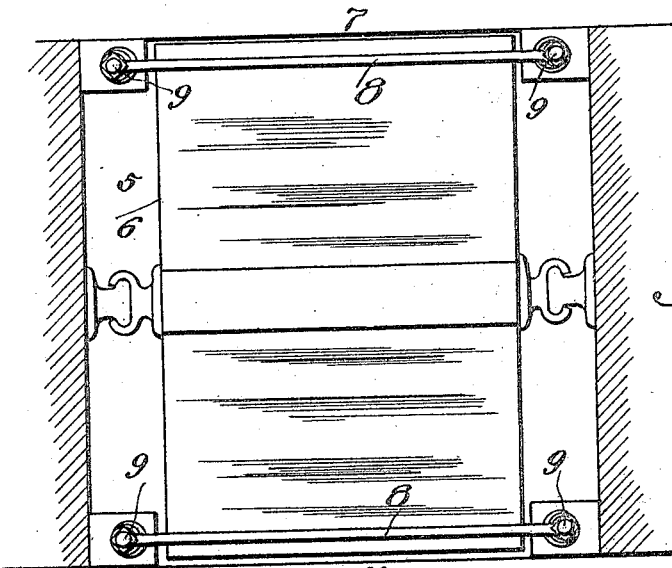

In the accompanying drawings, Figure 1 is an elevation of the invention. Fig. 2 is a plan view thereof. Fig. 3 is an elevation showing the gate open.

Referring specifically to the drawings, 5 denotes a mine-shaft in which the elevator-cage 6 travels. The landing 7 has an entrance to the shaft, which is barred by our gate. Although the invention is more particularly adapted for mine-shafts, it can be used with equal advantage on other kinds of elevator-shafts, and its usefulness is not limited to any particular kind of shaft.

The invention comprises a series of spaced horizontally-disposed bars 8, extending across the entrance to the shaft and in the path of the cage. The bars are mounted at their outer ends on posts 9, rising from the floor of the landing, and are vertically slidable thereon in a manner to be hereinafter described. The posts are progressively reduced on the inner side toward the top, forming a series of steps or shoulders 10, on which the bars 9 normally rest and in which position the entrance to the shaft is barred. The shoulders are so arranged that the bars are properly spaced when in this position.

The operation of the gate is as follows: When the ascending cage strikes the lower bar of the gate, it is slid upwardly on the posts. The lower bar strikes and lifts the next bar, and so on until all the bars are lifted by the cage, as shown in Fig. 3, in which the gate is shown open. When the cage descends, the bars drop to their respective shoulders, as shown in Fig. 1. The posts can be lubricated so that the bars will not stick, and the gate will be found efficient and reliable in operation, as there are no complicated parts to get out of order.

What we claim as new, and desire to secure by Letters Patent, is—

The combination with an elevator-shaft, of posts arranged at the landing and having a series of steps, a series of bars slidably mounted on the posts and extending across the entrance to the shaft, and constructed to be lifted by the elevator-cage, and which drop respectively upon the successive steps when the cage drops.

In testimony whereof we have signed our names to this specification in the presence of two subscribing witnesses.

GEO. BROWN.
GEORGE TAYLOR.

Witnesses:
WM. DIXON,
JOE BULLUS.